(12) United States Patent
Smrke

(10) Patent No.: US 9,027,469 B2
(45) Date of Patent: May 12, 2015

(54) METHOD FOR CONTROLLING A COOKING PROCESS

(75) Inventor: Albin Smrke, Domzale (SI)

(73) Assignee: MSX Technology AG, Stein (CH)

( * ) Notice: Subject to any disclaimer, the term of this patent is extended or adjusted under 35 U.S.C. 154(b) by 0 days.

(21) Appl. No.: 13/514,217

(22) PCT Filed: Sep. 3, 2010

(86) PCT No.: PCT/EP2010/062946
§ 371 (c)(1),
(2), (4) Date: Aug. 2, 2012

(87) PCT Pub. No.: WO2011/069695
PCT Pub. Date: Jun. 16, 2011

(65) Prior Publication Data
US 2013/0084369 A1    Apr. 4, 2013

(30) Foreign Application Priority Data

Dec. 7, 2009  (DE) .......................... 10 2009 056 980
Dec. 15, 2009  (DE) .......................... 10 2009 058 172

(51) Int. Cl.
| | |
|---|---|
| A47J 43/28 | (2006.01) |
| A01K 43/00 | (2006.01) |
| G01N 33/02 | (2006.01) |
| A47J 27/62 | (2006.01) |
| G05D 23/275 | (2006.01) |
| H05B 1/02 | (2006.01) |

(52) U.S. Cl.
CPC .......... *A47J 27/62* (2013.01); *G05D 23/27535* (2013.01); *H05B 1/0258* (2013.01)

(58) Field of Classification Search
CPC .................................. A47J 31/36; A47J 31/52
USPC ............................................. 99/342; 426/231
See application file for complete search history.

(56) References Cited

U.S. PATENT DOCUMENTS

| | | | |
|---|---|---|---|
| 4,869,233 A | 9/1989 | Stulen et al. | |
| 4,994,652 A | 2/1991 | Wolf et al. | |
| 4,996,403 A * | 2/1991 | White | ........................... 219/706 |
| 6,089,146 A * | 7/2000 | Nam et al. | ...................... 99/468 |
| 6,118,104 A | 9/2000 | Berkcan et al. | |
| 6,118,105 A * | 9/2000 | Berkcan et al. | ............... 219/497 |
| 6,236,025 B1 | 5/2001 | Berkcan et al. | |

FOREIGN PATENT DOCUMENTS

| | | |
|---|---|---|
| DE | 31 46 638 A1 | 7/1983 |
| DE | 38 11 925 C1 | 3/1989 |
| DE | 196 38 355 A1 | 4/1998 |

\* cited by examiner

*Primary Examiner* — Dana Ross
*Assistant Examiner* — Lindsey C Teaters
(74) *Attorney, Agent, or Firm* — Howard IP Law Group, PC

(57) ABSTRACT

In a method for controlling a cooking process of a cooking item contained in a cooking container, the sound of the cooking process is detected by means of at least one acoustic sensor and the course of the sound is directly analyzed for determining of a temperature and in particular the boiling point of the cooking item.

7 Claims, 5 Drawing Sheets

METHOD FOR CONTROLLING A COOKING PROCESS

Figure 1:
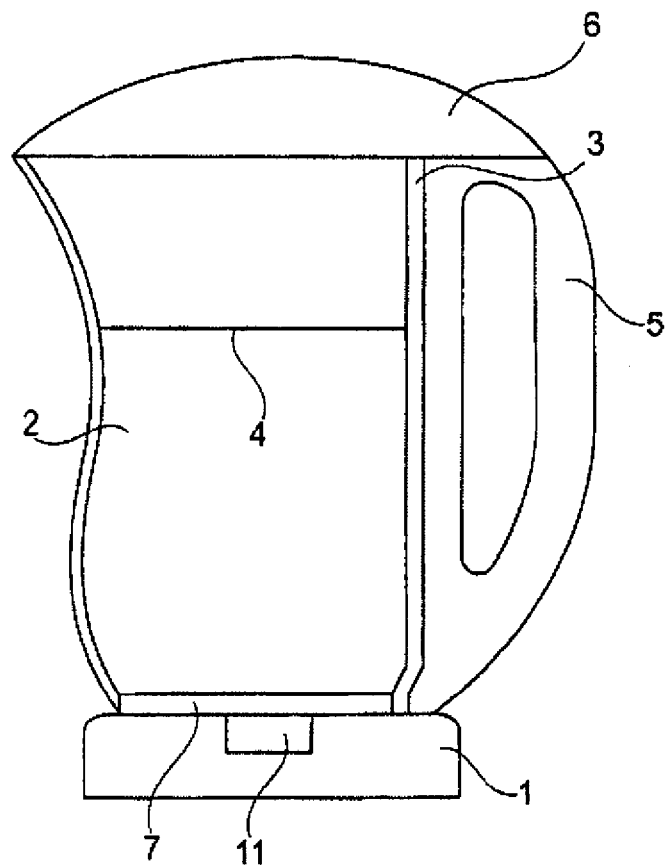

The invention relates to a method for controlling a cooking process of a cooking item contained in a cooking container and a system including a cooking container, a sensor and a control device.

Methods for automated control of cooking processes and corresponding cooking systems, for example composed of a stove and a cooking pot which is placed on the stove are known from the state of the art.

In a simple embodiment such a method or respectively, such a system is known from the field of water cookers. These autonomously heated cooking containers which are intended exclusively for heating water are usually provided with a bimetal switch in the region of the cover, which bimetal switch after reaching the boiling point is heated by the significant amounts of water vapor generated in this instance and after reaching a defined temperature interrupts the energy supply to the heating element due to a sufficient deformation, i.e. switches off the water cooker. However, because the bimetal switch is heated up only slowly by the water vapor, the water in these cookers boils bubbling for a certain period of time before the water cooker automatically switches itself off. In principal, this is unnecessary and does not only increase the time for which the user has to wait until using the water which has been brought to boil, but is also associated with an unnecessary energy consumption, which in some water cookers can be up to 15% of the total energy used to heat up the water.

From the state of the art, water cookers are also known, which use electronic temperature sensors (in particular semiconductor sensors) for determining the temperature of the water. Measuring the temperature of the water requires the temperature sensor to be in direct contact with the water. In order to ensure that this direct contact is also given at all filling levels of the water in the water cooker, most of the time the temperature sensor is integrated in the bottom of the water cooker. However, at this location the sensor directly neighbors the heating elements which falsify its measurement values. Thus, it is necessary to conclude the actual temperature of the water from the measured temperature, which is subject to a certain error.

Further, many methods are known from the state of the art which aim to monitor and to automate the cooking process on the stove for producing meals.

For example, a device for controlling the heat output of a cooking plate is known from DE 38 11 925 C1 in which a temperature sensor is integrated in the cooking plate in close proximity to the cooking container. By means of the temperature determined by the temperature sensor, the heat output is controlled by switching the heating element of the cooking plate on and off. A problem in this type of heat control is that the boiling temperature of the cooking item whose main component is water depends among other things on the salt content and the local air pressure, wherein even small fluctuations of the air pressure cause a significant deviation of the boiling temperature. This change of the boiling temperature cannot be taken into account by the temperature sensor so that use of the device known from DE 38 11 925 C1 for an automated control of a cooking process is limited.

An alternative boiling point control for kitchen stoves is known from DE 31 46 638 A1 in which the detection of the boiling point of a liquid which is located in a cooking container occurs by means of a sensor for structure borne sound, which for example can be arranged underneath the cooking container and determines the structure borne sound of the cooking container at boiling.

Further, DE 196 38 355 C2 discloses a method for determining the boiling point of a cooking item contained in a container, which is based on detecting the sounds which are emitted during the cooking process by means of an acoustic sensor, and analyzing and using these sounds for controlling the energy input to the cooking container. The sound detected by the acoustic sensor is analyzed in a complicated method to ensure that the boiling point can be determined independent of the type and size of the cooking container, whether or not a lid is used, the fill level and the viscosity of the cooking item and the type and size of the cooking place. The sound which is generated in the cooking process is divided into a lower low frequency range and an upper high frequency range, wherein in each range the amplitudes are either measured for the entire bandwidth, for multiple frequencies or for smaller frequency ranges of the frequency spectrum. From the respective amplitudes of the lower and the upper frequency range a mean value is then formed. These two mean values are regularly compared to one another, wherein in the phase of the nucleate boiling the mean value of the lower frequency range lies below the mean value of the upper frequency range, while in the phase of the bubbling boiling, the opposite relation exists. The frequency selective analysis of the cooking sound is intended to make it possible to interrupt or throttle the energy input to the heating device in the heating up phase after the time point at which the mean value of the lower frequency range exceeds the mean value of the upper frequency range, while in the cooling down phase after the time point at which the mean value of the upper frequency range exceeds the mean value of the lower frequency range the energy input is reinitiated or increased. This frequency selective analysis of the sound which is detected by the acoustic sensor requires a relatively high computing power and thus corresponding processors whose integration for example in water cookers of a low to middle price class is associated with excessive costs.

Based on this state of the art, the invention is based on the object to provide a simplified method for controlling a cooking process of a cooking item contained in a cooking container. Further, a system is to be provided which is suited for carrying out this method.

This object is solved by a method according to the independent patent claim 1 and by a system according to the independent patent claim 11. Advantageous embodiments are the subject matter of the respective dependent patent claims and follow from the following description of the invention.

The invention is based on the idea to determine the (overall) sound level of the cooking process by means of an acoustic sensor and to directly (i.e. without frequency selective analysis) analyze the course of the sound over time for determining the temperature and in particular the boiling point of the cooking item.

The inventor has found that an analysis of the course of the sound over time allows determining the boiling point of the cooking item accurately and without significant time delay. In a smoothed course of the overall sound level over time, the boiling point is represented as a first low point (i.e. the course transitions from a negative slope to a positive slope). The low point succeeds a first high point in time (in which the course transitions from a positive to a negative slope). The overall sound level thus increases relatively slowly up to the first high point and subsequently drops relatively slowly again, until reaching the boiling point (first low point). There, a renewed strong increase in the overall sound level occurs within a relatively short period of time, which is due to the bursting of the bubbles at the surface of the liquid of the cooking item which bubbles form in the liquid of the cooking item. Further analysis of the course of the sound also allows accurately determining other temperatures (in particular a temperature of about 80°, which is reached shortly after reaching the first high point). These temperatures then allow drawing conclusions with regard to all further temperatures.

A smoothening of the course of the measured sound can occur in any desired manner, for example by time-dependent averaging. In addition, or as an alternative a defined period of time for example up to 20 seconds after switching off the water cooker may be disregarded, which period of time is characterized by particularly strong measurement value fluctuations (compare FIG. 4) and for which it can be excluded that the cooking item has already reached a relevant temperature, in particular the boiling point. It has proved particularly useful to perform a smoothening over this by observing which slope and the subsequent drop occur within a relatively short period of time. These can then be identified as fluctuations and not as a course of the sound to be determined and can be cancelled when determining the temperature of the cooking item.

A method according to the invention for controlling a cooking process of a cooking item contained in a cooking container is thus characterized in that the sound of the cooking process is detected by means of an acoustic sensor and the course of the sound over time is directly analyzed for determining the temperature and in particular the boiling point of the cooking item.

"Method for controlling a cooking process" in the simplest embodiment relates to determining a temperature and in particular a boiling point of the cooking item at least once. In more complex embodiments this method can include additional method steps, such as for example automated control of an energy input to the cooking process.

According to the invention, the sound of the cooking process can be measured and analyzed in the form of its sound pressure (in Pa) or its sound intensity (in $W/m^2$)—or a physical parameter derived there from. Preferably, the (logarithmic) sound pressure level (in dB) is used for the analysis.

An "acoustic sensor" relates to all sensors which are capable to measure the sound of the cooking process and to generate a sensor signal from this. A preferred embodiment of a sensor suited for carrying out the method according to the invention is a microphone.

"Cooking item" relates to all substances which are to be heated up during a cooking process, optionally until reaching the boiling point. This includes in particular liquids and especially water, wherein however, solid substances can also be part of the cooking item. Because the cooking process according to the invention includes in particular the preparation of food, this includes in particular and expressly solid foods such as for example vegetables which also do not have to be located in a liquid bath (in particular of water).

A corresponding system according to the invention includes at least one cooking container for accommodating a cooking item, at least one acoustic sensor for detecting the (overall) sound of a cooking process of the cooking item and at least one control device for determining the temperature and in particular the boiling point of the cooking item by directly analyzing the course of the sound.

The analysis of the course of the sound according to the invention additionally allows determining the respective filling amount of the container in a simple manner, because the slope until reaching the first high point depends on the filling amount of the cooking container. Two measurements with different fill levels of a cooking container and the determination of the respective course of the overall sound level already allow drawing a mathematical conclusion with regard to the respective course of other fill levels of the same cooking container. Contrariwise, based on a concrete course of the overall sound level, conclusions can be drawn with regard to the respective fill level.

In a preferred embodiment of the method according to the invention it can be provided to only use one frequency spectrum for determining the sound of the cooking process. This allows filtering out a majority of the noise which is not attributable to the cooking process of the cooking item. This can occur by at least one frequency filter in the device.

Particularly preferably, only the frequency spectrum between 500 Hz and 3000 Hz may be used for determining the overall sound level, which is characteristic for the heating up of water until the boiling point.

In an advantageous embodiment of the invention, the cooking process can additionally be monitored by at least one temperature sensor. This allows a further increase in accuracy with which certain process parameters of the cooking process and in particular the boiling point of the cooking item can be determined. The combination of the acoustic sensor according to the invention with at least one additional temperature sensor is in particular useful when the cooking process is carried or is to be carried out without or with only a small amount of liquid (in particular water).

When the cooking process includes the preparation of meals, the additional monitoring of the cooking process by means of at least one temperature sensor is useful in particular for roasting and braising because in this process no sound is produced which has the characteristics of reaching a boiling point of a liquid.

Particularly preferably, a spatial temperature course can be determined by connecting two spaced apart temperature sensors and from this determine—according to known mathematical methods—a temperature field from which the temperatures in the interior of the cooking container can be determined locally. Preferably, at least one of the at least two temperature sensors can be provided in a lid of the cooking container, in the bottom of the cooking container and/or in a heating device for the input of heat energy into the cooking container. Particularly preferably, two temperature sensors are provided, one of which is arranged in the lid of the cooking container and the other one is integrated in the heating device, wherein the temperature in the bottom of the cooking container is determined based on the heating device.

Of course, a different arrangement of the temperature sensors is also possible, for example by integrating a temperature sensor in a wall of the cooking container or its positioning by means of a holding element in the interior of the cooking container.

Particularly preferably, the measuring value of at least one of the sensors can be used for the automated control of the energy input of the cooking process. A control device for the automated control of the heat input of the heating device is then provided on the side of the device in dependence on the measuring values of at least one of the sensors.

Preferably, the measuring values can be inputted to a fuzzy-logic control as input values (or respectively, as input value function), which fuzzy-logic control produces a control signal for the energy input as output value.

The method according to the invention and the system according to the invention are particularly suited for the use in cooking processes, in which meals are prepared. However, it is also expressly noted that the invention can advantageously be used in any system in which a liquid is heated in particular until reaching a boiling point and the energy input for the heating process is optionally controlled in an automated manner. For example, an application in the area of water boilers or other ovens for heating liquid (or solid matter until the liquid phase) is possible.

In the following, the invention is explained in more detail by way of the exemplary embodiments shown in the drawings.

Figure 2:
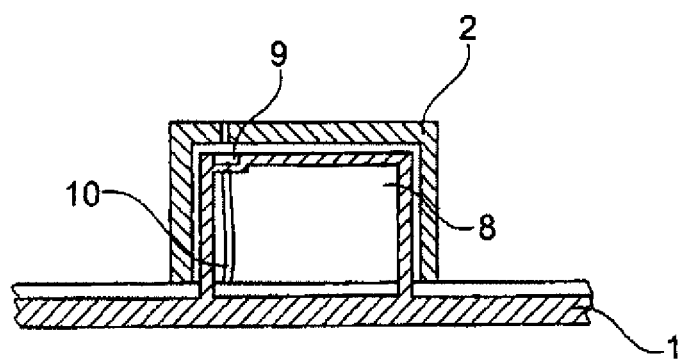
Figure 3:
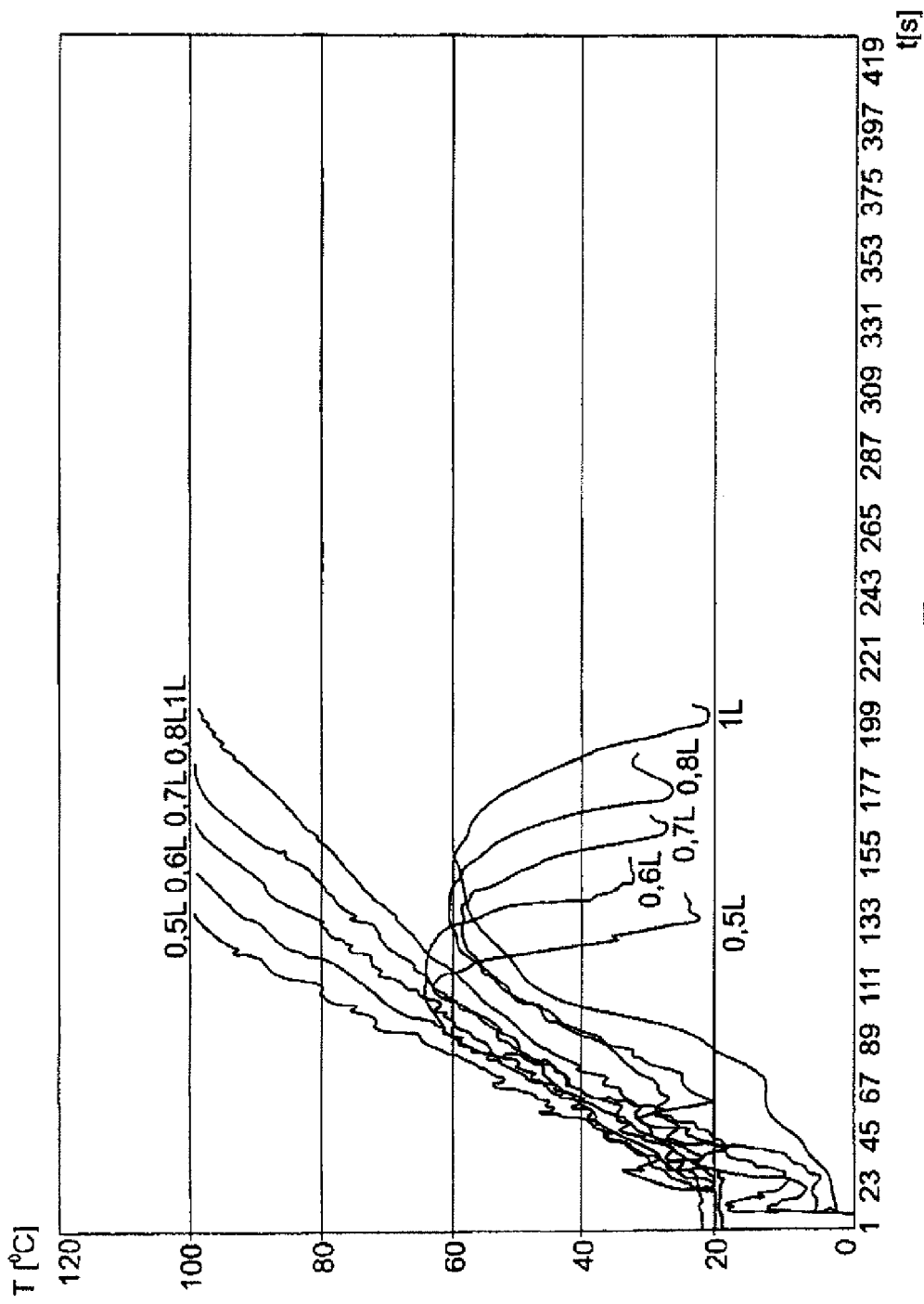
Figure 4:
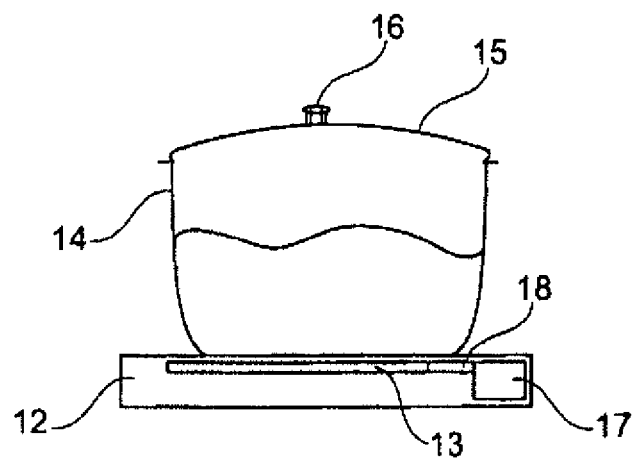
Figure 5:
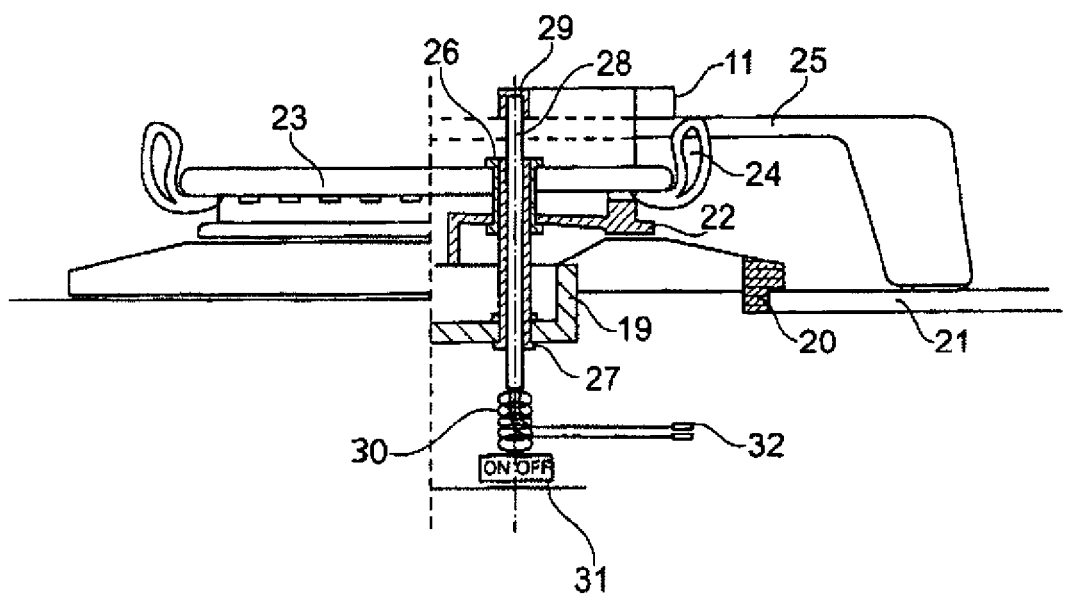
Figure 6:
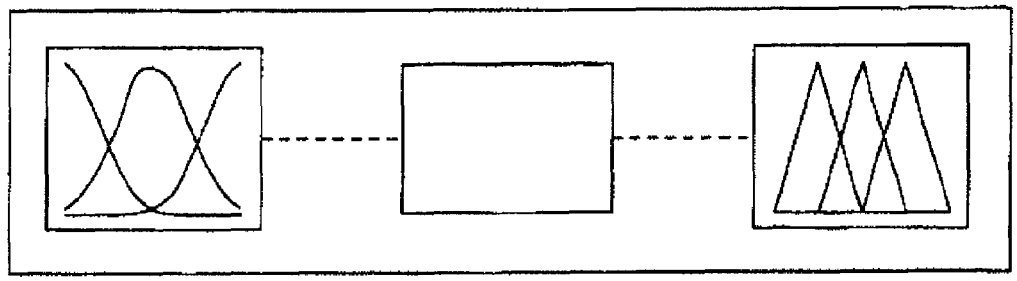
Figure 7:
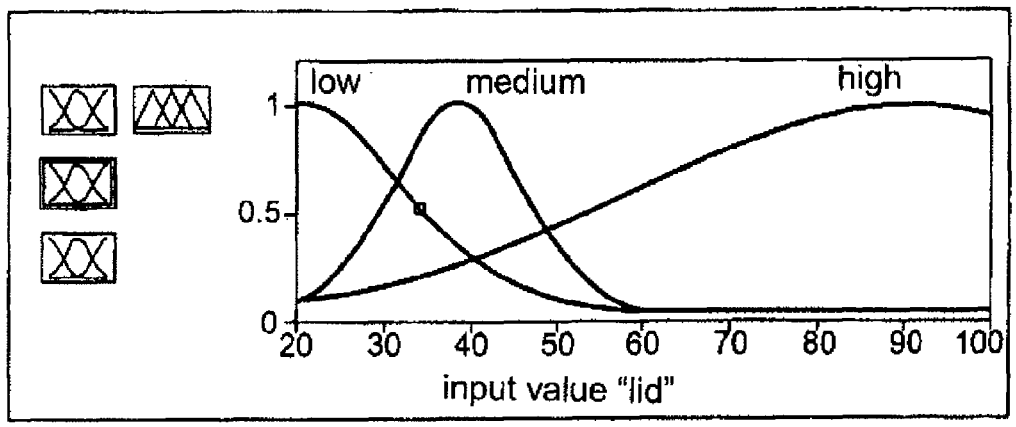
Figure 8:
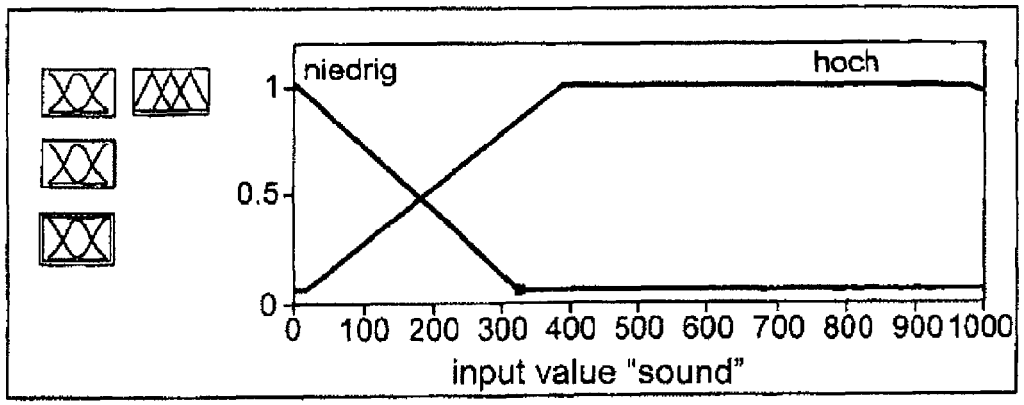
Figure 9:
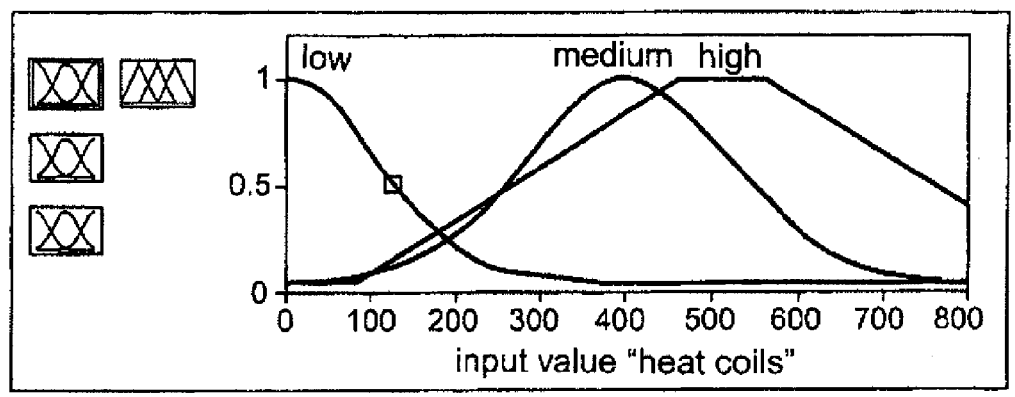
Figure 10:
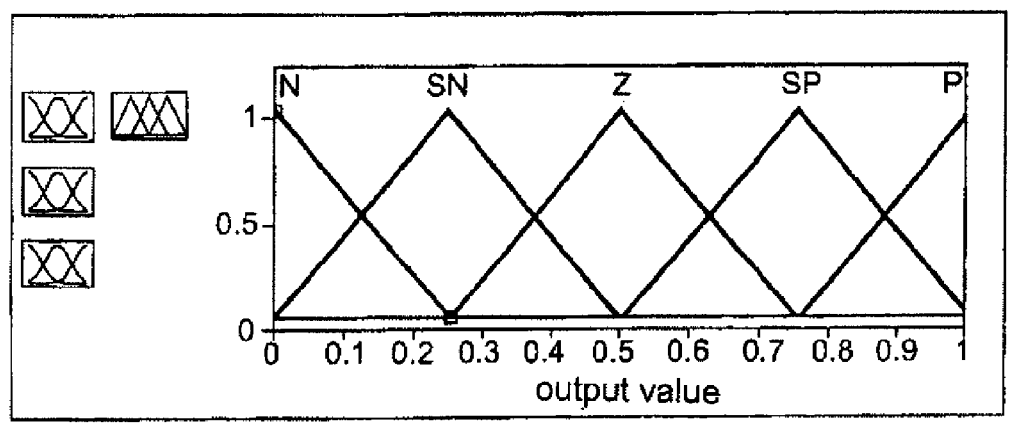

In the drawings it is shown in:

FIG. 1: an embodiment of a system according to the invention in the form of a water cooker;

FIG. 2: a cross section through a part of the water boiler according to FIG. 1;

FIG. 3: a diagram in which the time course of the water temperature and the sound over the time for different fill levels of the water cooker according to FIG. 1 is shown;

FIG. 4: a second embodiment of a system according to the invention in form of a cooking pot on an electrically operated oven;

FIG. 5: a gas cooking plate for use in a system according to FIG. 4;

FIG. 6: in a schematic representation, the function of a control device of a system according to FIG. 4, which control device is based on fuzzy-logic;

FIG. 7: in a diagram, a first input value function of the fuzzy-logic control according to FIG. 6;

FIG. 8: in a diagram, a second input value function for the fuzzy logic control according to FIG. 6;

FIG. 9: in a diagram, a second third input value function of the fuzzy-logic control according to FIG. 6;

FIG. 10: the output value function of the fuzzy-logic control according to FIG. 6.

FIG. 1 shows a first embodiment of a system according to the invention in form of a water cooker.

The water cooker is composed of a bottom part 1 and a top part 2 detachably connected to the bottom part 1. The top part 2 includes a housing 3, in which a fill room 4 for water is provided, which can be filled with water by a user of the water cooker to a desired fill level. For handling of the top part 3, the latter is provided with a handle 5. A lid 6 avoids an unnecessary energy loss by escaping of vapor of the water which is heated up by closing the fill room 4. In the fill room 3 or in the walls delimiting the fill room (in particular in the bottom 7) one or more heating elements (not shown) are integrated, which are supplied with an electric voltage for heating the water which is contained in the fill room 4. The electric voltage is generated via an electric plug-in contact between the top 2 and the bottom part 1 of the water cooker. For this, the bottom part 1 of the water cooker is connected to an electricity supply (not shown) of the home.

FIG. 2 shows a section from FIG. 1 in a sectional side view which shows the electric plug-in contact between the top 2 and the bottom part 1 of the water cooker. For forming the plug-in contact, the bottom part 1 of the water cooker has a base 8 with a circular cross section, which engages in a corresponding recess of the top part 2 of the water cooker. Via not shown electrical contact elements an electrical contact is established in a top part which is attached to the bottom part 1 of the water cooker between the heating element or heating elements of the top part 2 of the water cooker and the electricity supply of the home. This electrical contact can additionally be interrupted (and closed again) by a switch which on one hand can be actuated manually and on the other hand can be influence by a control device of the water cooker.

According to the invention, the water cooker according to FIG. 1, has an acoustic sensor in form of a small microphone 9, which is integrated into the base 8 of the bottom part 1. The microphone 9 is connected to a control device 11 of the water cooker via electrically conducting cables 10, which control device 11 includes a microprocessor and a data memory. In the data memory an algorithm of the fuzzy-logic control is stored which can be executed by means of the micro processor in order to analyze the measurement values which have been sent by the microphone 9 to the control device, in order to determine according to the invention the temperature and in particular the boiling point of the water which is to be heated up in the water cooker. A detection of the sound by means of the microphone 9 only occurs when the water cooker is switched on, i.e. when water is heated up in the water cooker.

Of course, it is also possible to integrate the microphone 9 into the water cooker at any other desired site.

FIG. 3 shows in a diagram the course (over time) on one hand of the temperature of the water in the top part 2 of the water cooker and on the other hand the sound which is detected by the microphone 9 and is in particular influenced by the heating up of the water for different fill levels (0.5 l, 0.6, 0.7 l, 0.8 l and 1 l) of the water cooker. Because the water cooker can only be switched on and off by means of the switch and thus can only be switched between a zero and a maximal heat input, the increase of the temperature is largely linear over time. A greater fill level of the water cooker leads to a smaller increase of the temperature course and as a consequence to a longer time until reaching the boiling temperature at about 100° C.

Based on the course of the sound, the reaching of the boiling point of the water which is contained in the water cooker can be determined with very high accuracy and without significant time delay. Initially, the course of the sound shows a strong increase until a temperature of about 50° C. of the water which then transitions into a slower increase. At a water temperature of about 80° C. an absolute maximal value of the sound is reached. After reaching this maximal value (which is characterized by a respective first high point of the smoothed course) the sound first decreases weakly and then increasingly stronger, until reaching the boiling point. After reaching the boiling point, a renewed increase of the sound occurs within a relatively short period of time. This strong increase of the sound is due to the then bubbling boiling of the boiling water with gas bubbles which burst at the surface of the water. The low point of the course of the sound which is generated by the relatively sudden renewed increase of the sound can be recognized by the control device with a relatively small time delay and from this the information can be derived that the boiling point of the water to be heated in the water cooker has been reached. A device for open loop control of the control device can then generate a signal which leads to switching off of the water cooker.

The hissing sound which indicates the impending boiling point is generated by locally exceeding the temperature dependent vapor pressure on the heating elements of the water cooker, which results from small boiling retardations (strongest sound) which are locally triggered on bubble nuclei. A short time after this, the sound changes at the transition to a bubbling boiling, i.e. when the vapor bubbles detach from the heating coils, ascend in the water and burst at the water surface.

Of course, an embodiment of the water cooker is also possible in which the energy input is not (permanently) interrupted after reaching the boiling point, but the control device—optionally due to a manual pre-selection by the user—controls the energy input so that the cooking state (for example the boiling point) is maintained with reduced energy input. This can occur by decreasing the power of the heating device and also for example by periodically switching the energy input to the heating device on and off.

FIG. 4 shows a second embodiment of a system according to the invention in form of a cooking place 12 with an electric cooking plate 13 and a cooking pot 14 with a lid 15 arranged on the cooking plate 13. The electric cooking plate 13 can be integrated in a cooking stove with multiple cooking places. A cooking item is prepared in the cooking pot. The cooking pot can have different dimensions and be configured to be capable of being placed on the cooking place as it is common in home kitchens, or it can be arranged fixed on the cooking place or integrated into the latter, as it is common in professional kitchens. The electric cooking plate can be configured as electrically heated cooking plate or as induction cooking plate. Instead of an electric cooking plate 13, a cooking plate operated with gas (compare FIG. 5) or vapor can be used.

If the cooking stove has multiple cooking places, each cooking place can have a sensor for sensing the presence or absence of a cooking pot or other cookware, which sensor is for example configured as induction loop, whose inductivity changes depending on whether a cookware is placed on the cooking place or not.

According to the invention, the system has an acoustic sensor 16 for detecting the sound which occurs during cooking. The acoustic sensor is part of an integrated sensor unit. In this exemplary embodiment, the sensor unit is integrated into the handle 16 of the lid. In alternative embodiments, the sensor unit or only the acoustic sensor may be integrated for example into the wall of the cooking pot or into the cooking plate or respectively, the cooking place. Further, it is possible to provide the acoustic sensor in a sensor unit which can be detachably fastened on the cooking pot. This allows using the sensor unit together with any desired cooking pots or respectively, other cook wares and to retrofit this cookware according to the invention. For this, the detachable sensor unit only has to be connected to the cookware at a convenient site. This can preferably occur magnetically.

The detection and analysis of the liquid cooking items which are contained in the pot during cooking occurs in a manner identical to the one described for the exemplary embodiment by way FIGS. 1 to 3.

The measurement values are wirelessly transmitted to a control device 17 which is integrated into the cooking place. This occurs by means of a transmission unit which is also integrated into the sensor, which transmission unit can be a customary transmission device, and which is capable of transmitting data by means of electromagnetic waves for example in the range of 2.4 GHz. The measuring values are received by a receiving unit 18 of the control device and then analyzed by means of a microprocessor. The measurement values serve as input values of a fuzzy-logic control which generates an output value which is provided to an open loop control device of the control device, which carries out an automated control of the energy input to the cooking plate.

While the control in the exemplary embodiment according to FIGS. 1 to 3 can be relatively simple, namely only provide for switching off the water cooker when the boiling temperature is reached, the control of the system according to FIG. 4 is preferably configured more complex. When cooking in a pot, meals are usually prepared whose cooking process is more complex. Thus, the preparation of a meal can for example include heating up the water or a different liquid up to the boiling point and subsequent continued cooking with boiling or simmering (simmer phase) liquid. The solid cooking item can already be contained in the liquid during the heating up phase or only be added into the liquid later, for example after reaching the boiling point.

Because each cooking process is different due to the use of different cooking items (for example cooking with a large or small amount of liquid (water), braising or roasting, holding of a defined relatively low temperature for thawing of frozen food, cooking or frying with a temperature above 100° C.) other sensors can also be provided in the system according to the invention, such as for example one or multiple temperature sensors, moisture sensors, smoke sensors, pressure sensors or motion sensors (for detecting the motion of the cooking items and/or the cookware). This allows controlling the energy input even more accurately and in particular to also automatically analyze and control types of cooking and cooking states other than those with water.

In the exemplary embodiment shown in FIG. 4, two temperature sensors are provided in addition to the acoustic sensor, a first one of which is integrated into the pot and concretely into the sensor unit in the handle of the lid, and a second one is integrated into the cooking place (an alternative can also provide the integration of the second temperature sensor into the bottom of the pot).

In electrically heated cooking plates, the second sensor can for example be arranged between the heating resistors and the glass ceramic plate which covers the heating resistors and can have a flat ceramic substrate with resistor mass. In induction plates, the temperature sensor which is provided anyway can be used.

Both sensors transmit their measurement values also to the control device wherein the first temperature sensor for this can use the wireless transmission unit of the sensor unit, while for the second temperature sensor which is integrated into the cooking place it is expedient to use a cable connection.

The second temperature sensor serves for determining the temperature in the region of the bottom of the cooking pot, from which temperature the temperature distribution (temperature field) in the cookware can already be determined in good approximation. The temperature field in the cookware can be determined even more accurately when the measurement values of the two temperature sensors are analyzed together. A further improvement can be achieved when the measuring values of the acoustic sensor are analyzed additionally for determining the temperature field. All this occurs by means of the control device by way of the fuzzy-logic control stored therein.

FIGS. 6 to 10 show schematic representations and diagrams to illustrate the principal functioning of the fuzzy logic control which is used in the system according to FIG. 4.

Based on the measuring values of the three sensors (input values), the fuzzy-logic control generates an output value function, which is provided to the open loop control device of the system, in order to control the energy input to the cooking process in an automated manner (FIG. 6). Input values are thus the temperatures measured by the sensors on the lid of the pot an in the region of the electrical heating coils and the sound.

FIGS. 7 to 9 show the fuzzy-logic functions for the three input values, which fuzzy-logic functions are the basis for the fuzzy-logic control and are stored in the memory unit of the control device. For the temperature dependent fuzzy-functions (FIG. 7: Temperature in the lid and FIG. 9: Temperature in the region of the heating coils) three modifiers were selected, by means of which the un-sharp term "hot" can be represented mathematically: low, middle and high. These modifiers are shown in the diagrams in form of a respective Gauβ' distribution with different spread over the temperature. Only for the modifier of the "high" temperature of the heating coils weighting is performed via an alternative (trapeze, shaped) function with a constant initial region, a subsequent linear increase, a second linear region and a subsequent linear decrease.

The course of the modifiers of the sound dependent fuzzy-functions (FIG. 8) is constant above a value of about 350. Between zero and this value the increase (modifier "high") or respectively, the decrease (modifier "low") is linear.

FIG. 10 shows the output value function which is determined by the fuzzy-logic control based on the input value functions. For this output value function, a total of five modifiers were selected: N: negative; SN: weakly negative; Z: zero; SP: weakly positive; and P: positive. The N-modifier initially shows a linearly decreasing course, which then runs at constant, then increases linearly. The course of the P-modifier is correspondingly inversed: first constant, then increasing linearly. The courses of the SN-, Z- and SP modifiers were selected triangular, i.e. linearly increasing and then linearly decreasing.

A time analysis of the temperature field allows calculating the energy to be emitted by the heat source to the cooking pot, in order to achieve a heating and continued cooking of the cooking item as needed.

A cooking process which is automated by the method according to the invention can proceed in two phases, namely a (optionally automated) heating phase and an automated continued cooking phase. During both phases, an analysis of the cooking process occurs with the goal of an automated manipulation.

The heating up phase begins, when the cooking pot with the meal to be prepared is placed on the cooking plate and the cooking stove is turned on. This can occur manually or controlled by means of a time switch. The heating up phase can last until a defined temperature field is reached in the cooking pot. During the automated continued cooking phase the energy input is controlled by the open loop control device in a most optimal manner. The continued cooking phase can last until a cooking time predetermined by an operator of the cooking place is terminated and the energy input is automatically or manually interrupted.

Because in practice, many different cooking processes exist, it is difficult to control the latter solely via an analysis of the measurement values of the sensors. For this reason, it is possible for an operator to input different basic cooking processes via an input device. In the present case, the following pre-selection inputs are possible: 1. Cooking with a large amount of water, 2. Cooking with a small amount of water, 3. Braising, 4. Roasting, 5. Maintaining a settable temperature, 5. Cooking with a cooking process selected (and defined in more detail in the control device) by the operator (selection via sub menu).

The cooking with a large amount of water is a common cooking process. Here, the basis for control is boiling. This includes at least the cooking of soups or of vegetable in a water bath. The cooking is controlled by an analysis of the temperature field and the overall sound level. The temperature sensor which determines the temperature of the bottom of the cookware can additionally serve for detecting a complete evaporation of the water and a temperature which is strongly increased due to the latter, so that by automatically reducing the energy input, up to a complete interruption, a burning of the cooking item and damage to the cookware can be avoided. Optionally, the operator can be alerted by an acoustic and/or optical warning signal.

When cooking with a small amount of water, as it is done in particular for steam cooking of vegetables in order to preserve vitamins and minerals, the inputted energy can be controlled very accurately in dependence on (only) the temperature field, because this is a cooking with steam. In this case, the acoustic sensor can serve as a safety element, for example to determine the time point, at which water in the cooking pot is completely evaporated, which is indicated by a changed or respectively, absent "cooking sound".

When braising or roasting, the energy is to be inputted in such a manner as to heat up the bottom of the cookware (in particular of a braising pot or a roasting pan (with or without lid)) as fast as possible to the respectively required temperature. Then, an acoustic signal can be emitted in order to inform the operator that the temperature has been reached so that the operator can optionally place the braising item or the roasting item into the cookware. After this, only the energy which is required for (continued) braising or (continued) roasting is automatically inputted.

In order for example to melt chocolate, to boil milk or to thaw frozen food, which requires a temperature which is below the boiling temperature of water, the operator can select or respectively, input the respective temperature of the respective cooking process via the input device.

Further, a particular cookware which has been associated by the control device with a corresponding cooking program can be selected via the input device. This can for example be provided for pressure cookers for which an energy input program exists, which is based on pressure and/or vapor sensors. Special cooking containers are also frying devices for frying with oil, woks or other typical cooking devices for the preparation of particular food. This preselecting of the cookware can also occur automatically, if for example the cookware a corresponding recognition signal to the control device.

FIG. 5 shows a possibility for integrating a temperature sensor into a gas cooking field. Such a gas cooking field can—instead of the electrically heated cooking field—for example be used in a system according to FIG. 4.

The burner of the gas cooking field includes a housing 19, which is fastened on a glass ceramic plate 21 of a kitchen stove via a carrier element 20. On the housing 19 of the burner, a burner bottom part 22 and a burner top part 23 are arranged, through which a gas and combustion air is conducted in a not shown manner. The flames 24 of the burning gas exit from openings between the burner bottom part 22 and the burner top part 23. Above the burner top part 23 a support 25 is arranged which rests on the glass ceramic plate 21, and on which cookware can be placed. A guide 26 is sealingly arranged between the burner bottom part 22 and the burner top part 23, through which guide 26 a further guide 27 is guided which extends as far as to the housing 19 and is fastened to the housing 19. This guide 27 receives a sensor carrier pin 28 which on its end which protrudes out of the burner top part 23 has a temperature sensor 29. Guided by the sensor carrier pin 28, the temperature sensor 29 can move up and down, wherein the sensor carrier pin 28 is moved into the shown upper position by a spring 30, in which position a switch 31 is opened. If cookware is placed on the support 25, the temperature sensor 29 moves downward with the sensor carrier pin 28 and closes the switch 31. This causes a signal to reach the control device 17 of the system, which indicates the presence of a cookware on the support. The temperature sensor 29 and the switch 31 are connected to the control device 17 via cables 32.

As soon as the control device 17 receives the signal that a cookware is placed on the cooking field, the gas supply is released and the exiting gas optionally ignited. In dependence on the previously selected basic cooking program among other things a then automatic control of the gas supply—in connection with the measuring values of the other sensors—occurs in dependence on the type and the progress of the respective cooking process.

If the cookware is removed from the gas cooking field, the gas supply is either automatically completely interrupted or down regulated to a degree that only a (as small as possible) standby flame is burning, which allows a fast starting of the gas cooking field when the cookware is placed again.

What is claimed is:

1. A system, comprising:
a cooking container for receiving a cooking item;
an acoustic sensor for detecting a sound of a cooking process of the cooking item;
a control device for determining a temperature of the cooking item by directly analyzing a course of the sound; and
two spaced apart temperature sensors,
wherein the control device is responsive to outputs of the two spaced apart temperature sensors for determining a temperature field for an inner space of the cooking container, and
wherein the control device is configured to provide for automated control of an input of heat into the heating device as a function of measuring values of the two spaced apart temperature sensors and the acoustic sensor.

2. The system of claim 1, wherein the control device has at least one frequency filter for filtering out at least one frequency spectrum of an overall sound.

3. The system of claim 1, wherein at least one of the two spaced apart temperature sensors is configured to determine a temperature in a region of at least one of the cooking item and the cooking container.

4. The system of claim 1, further comprising a heating device for introducing heat energy into the cooking container.

5. The system of claim 4, wherein at least one of the two spaced apart temperature sensors is arranged in at least one member selected from the group consisting of a lid of the cooking container, a bottom of the cooking container and the heating device.

6. The system of claim 4, wherein the acoustic sensor comprises a plurality of acoustic sensors, and wherein the control device is configured to provide for automated control of an input of heat into the heating device as a function of measuring values of one of the plurality of acoustic sensors.

7. The system of claim 1, wherein the control device is further responsive to an output of the acoustic sensor for determining the temperature field for the inner space of the cooking container.

* * * * *